Figure 1:
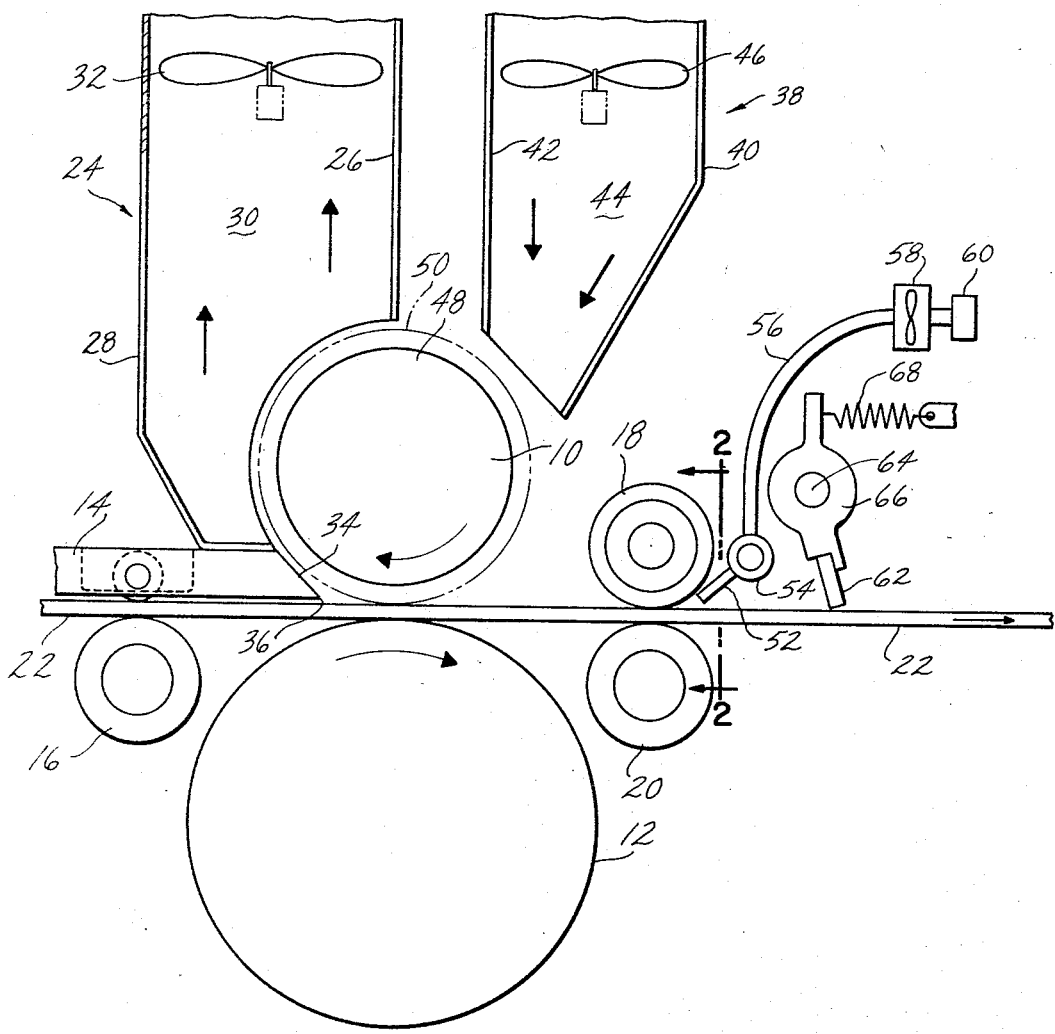

May 30, 1967   E. V. CAVAGNERO   3,322,037
CHIP EXHAUST SYSTEM
Filed May 25, 1964

INVENTOR.
ERMAN V. CAVAGNERO
BY McCormick, Paulding & Huber
ATTORNEYS

United States Patent Office 3,322,037
Patented May 30, 1967

3,322,037
CHIP EXHAUST SYSTEM
Erman V. Cavagnero, Torrington, Conn., assignor to The Torrington Manufacturing Company, Torrington, Conn., a corporation of Connecticut
Filed May 25, 1964, Ser. No. 370,001
5 Claims. (Cl. 90—11)

This invention relates to a chip exhaust system particularly adapted for use with a slab milling machine which includes a cutter rotatable about a horizontal axis in engagement with the upper surface of a slab moving continuously therebeneath. The general type of slab milling machine referred to is more fully illustrated and described in my copending application Ser. No. 369,999 entitled, "Slab Milling Machine," and filed on May 25, 1964, now Patent No. 3,250,179.

It is the general object of the present invention to provide a chip exhaust system for use with a slab milling machine of the type mentioned wherein the exhaust system is of a desirably simple construction and yet removes chips more efficiently than has heretofore been possible.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 2:
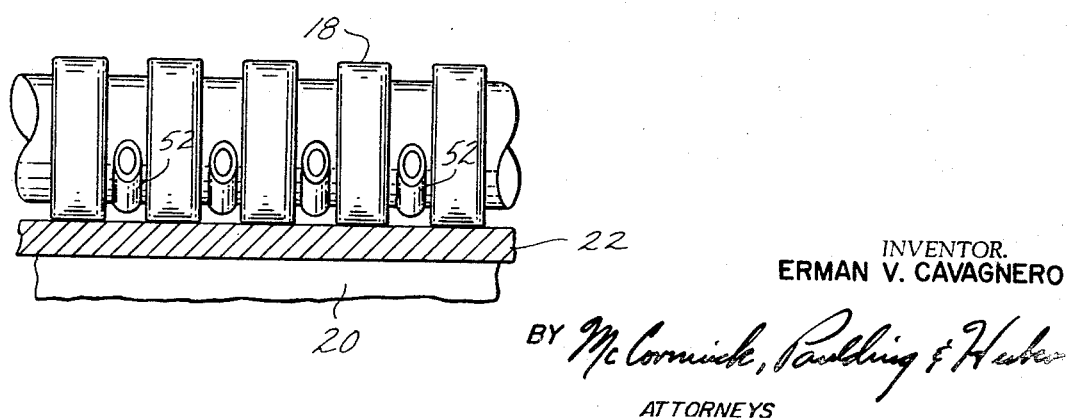

Of the drawing:

FIG. 1 is a schematic illustration of the chip exhaust system of the present invention; and FIG. 2 is a fragmentary section taken generally as indicated at 2—2 in FIG. 1.

Referring now more particularly to the drawings, it will be observed that a rotary cutter is shown schematically at 10 in association with a back-up roll 12 spaced therebeneath. Upper and lower entry guides are shown at 14, 16 and there are also provided upper and lower exit guides 18, 20. The four guides 14, 16, 18 and 20 are adjustable and engage a slab of metal which may be a copper or brass alloy 22 as it passes generally horizontally and forwardly from left to right through the milling machine. The cutter rotates in the clockwise direction as shown while the back-up roll also rotates in a clockwise direction and the guides, particularly the upper guides 14, 18, serve to bend the slab slightly about the back-up roll for superior milling. Further details of construction and operation of the milling machine may be had in my aforementioned copending application.

A first element of the chip exhaust system comprises a chip pick-up and exhaust duct indicated generally at 24 and including front and rear walls 26, 28 and opposing side walls 30, 30, one shown. The duct 24 preferably extends generally vertically as shown and the side walls thereof 30, 30 preferably have partially circular lower end portions on a diameter slightly larger than that of the cutter 10 so as to be conveniently located in close proximity to the said cutter. Air is drawn inwardly and upwardly through the chip pick-up and exhaust duct 24 by appropriate air moving means operatively associated with the duct whereby to draw the chips into the duct and to exhaust the same. A fan is shown schematically at 32 and it will be understood that the fan is of a comparatively high capacity, for example a fan of a type adapted to be driven by a motor in the 75 horsepower range.

The cutter 10 throws chips in a rearward direction above the surface of the slab 22 generally toward the chip pick-up and exhaust duct and against a baffle means 34. The baffle means 34 extends across the slab and has a lower and forward edge 36 in engagement with the slab and an inclined surface extending upwardly and rearwardly therefrom to the lower edge of the chip pick-up and exhaust duct 24. Preferably and as shown, the baffle means 34 comprises a forward surface on the guide 14 which takes the form of a shoe in close engagement with the slab 22 as it passes therebeneath. With the baffle means disposed as shown, chips thrown rearwardly from the cutter 10 are deflected upwardly and rearwardly into the chip pick-up and exhaust duct and a collection of chips adjacent the inlet of the duct is avoided. The said baffle means constitutes an important part of the present invention.

Further in accord with the present invention, there is provided a secondary air moving means and an associated duct extending across the slab on the exit side of the cutter 10. The said duct comprises an air supply duct shown generally at 38 with front and rear walls 40, 42 and side walls 44, 44, one shown. The duct extends downwardly adjacent the exit side of the cutter 10 and supplies a large volume of air so as to insure a large volume of air flowing rearwardly to the pick-up and exhaust duct 24 and thereby insure efficient pick-up and exhaust of the chips severed from the slab 22 by the cutter 10. The air moving means associated with the supply duct 38 comprises a large fan indicated schematically at 46 and which may have an associated motor on the order of 10 horsepower.

As mentioned in my copending application referred to above, the cutter 10 preferably comprises a drum or cylinder 48 having a plurality of cutting inserts mounted therein. The cutting inserts may extend outwardly to the dotted line 50, forming the actual cutting diameter. Further, the said inserts are spaced apart providing substantial area for the right-to-left or front-to-rear passage of air at a lower portion of the cutter. Thus, the air discharged downwardly on the right-hand or exit side of the cutter 10 is permitted to pass readily beneath and around the cutter and results in a large volume of air moving into the pick-up and exhaust duct 24 as required for efficient chip pick-up and exhaust.

Referring now particularly to FIG. 2, it will be observed that the upper exit guide 18 comprises a series of small rolls spaced laterally so as to result in a series of laterally spaced openings. As a secondary means of blocking chips severed from the slab 22 by the cutter 10 and insuring that such chips do not remain on the upper surface of the slab, there is provided a means for discharging jet streams of air in a rearward direction along the slab. Said means are indicated schematically as small nozzles 52, 52 in FIGS. 1 and 2 disposed so as to discharge downwardly and rearwardly in the spaces between the small rolls of the guide 18. The jet streams emitted from the nozzles 52, 52 serve to blow chips rearwardly so as to be picked up by the cutter or the aforesaid rearwardly moving air stream and moved rearwardly against the baffle means 34 and upwardly into the pick-up and exhaust duct. A manifold 54 extends transversely across the slab in communication with the nozzles 52, 52 and is supplied by a line 56 and a small high velocity air turbine 58 driven by a motor 60.

Finally and as a further precaution against chips being carried upon the upper surface of the slab 22 rightwardly and into other machinery, there is provided a mechanical wiper 62. The wiper 62 extends transversely across the slab and is inclined slightly upwardly and rearwardly with respect to the slab. The wiper may be constructed of felt and is pivotally mounted at 64 by means of a holding bracket 66. The upper portion of the bracket 66 is connected with a spring 68 which urges the wiper into engagement with the upper surface of the slab under a desired pressure.

From the foregoing, it will be apparent that the chips severed from the slab 22 by the cutter 10 are effectively cleared from the surface of the slab. Any chips escaping the rearwardly moving air stream beneath the cutter are blown back into the air stream by means of the jet nozzles 52, 52 so as to be picked up in the exhaust duct 24. Should chips manage to elude the air stream beneath the cutter and then pass beneath the jet nozzles 52, 52 as well, the mechanical wiper 62 positively prevents any rightward passage of the chips as might damage the slab or apparatus associated therewith in subsequent operations.

The invention claimed is:

1. In a chip exhaust system for a slab milling machine wherein a cutter rotatable about a horizontal axis engages and turns in a direction opposite to the movement of the upper surface of a slab or the like in continuous generally horizontal lengthwise forward movement therebeneath; the combination comprising a chip pick-up and exhaust duct having an inlet opening adjacent the entry side of the cutter and above and across the slab or the like, baffle means associated with the pick-up and exhaust duct adjacent its inlet opening and extending across the slab, said means comprising a surface having a lower and forward edge at least approximately in engagement with the slab passing therebeneath, and said surface having an inclination from said edge upwardly and rearwardly away from the cutter so as to engage chips thrown rearwardly from the cutter and to deflect the same upwardly and rearwardly into said inlet opening, air moving means operatively associated with said duct to draw air and chips into said inlet opening, an exit guide and support means engaging the slab on a side thereof opposite said chip pick-up and exhaust duct and extending across the slab but engaging the slab only at spaced intervals whereby to define a plurality of laterally spaced openings, and a means for discharging a jet stream of air through said openings in a rearward direction whereby to blow chips rearwardly and toward said pick-up and exhaust duct.

2. The combination in a chip exhaust system as set forth in claim 1 and including air supply means comprising a second air moving means and an associated duct extending across the slab on the exit side of the cutter, said duct serving to supply air to the area adjacent the exit cutter side and to thereby insure a substantial flow of air as necessary to carry chips into the aforesaid pick-up and exhaust duct.

3. The combination in a chip exhaust system as set forth in claim 1 wherein said baffle means comprises a part of a slab guide and support means engaging the slab and operatively associated with the cutter.

4. The combination in a chip exhaust system as set forth in claim 1, a chip wiper disposed across and in engagement with the slab in spaced relationship with and on the exit side of the cutter.

5. The combination in a chip exhaust system as set forth in claim 1, wherein said means for discharging a jet stream of air comprises a plurality of small jet nozzles directed angularly downwardly toward said openings and the slab.

References Cited
UNITED STATES PATENTS

| | | |
|---|---|---|
| 2,071,619 | 2/1937 | Fiegel. |
| 3,135,151 | 6/1964 | Link et al. _____ 83—100 |

FOREIGN PATENTS

| | | |
|---|---|---|
| 592,321 | 2/1934 | Germany. |
| 807,140 | 7/1949 | Germany. |

OTHER REFERENCES

American Machinist/Metalworking Manufacturing (Special Report No. 509), July 24, 1961, pp. 95–102.

WILLIAM W. DYER, JR., *Primary Examiner.*

G. A. DOST, *Assistant Examiner.*